Figure 1:
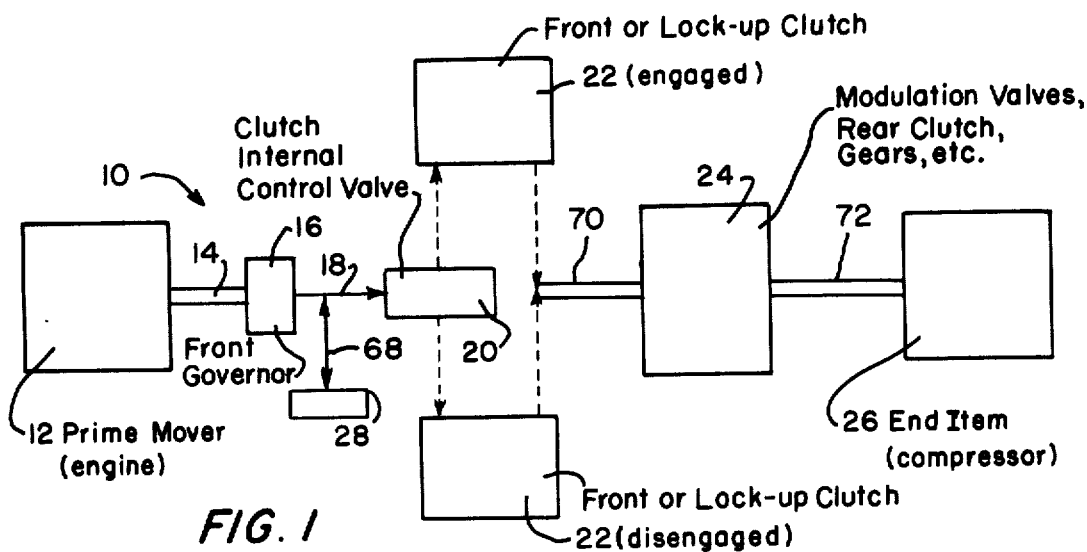

United States Patent [19]

Miller et al.

[11] 4,384,827

[45] May 24, 1983

[54] PNEUMATIC CONTROLLING MEANS FOR, AND IN COMBINATION WITH, A POWER TRANSMISSION, AND METHOD OF RETROFITTING TRANSMISSIONS THEREWITH

[75] Inventors: Kenneth Y. Miller, Salisbury; Glenn E. Miller, Mocksville, both of N.C.

[73] Assignee: Ingersoll-Rand Company, Woodcliff Lake, N.J.

[21] Appl. No.: 183,223

[22] Filed: Sep. 2, 1980

[51] Int. Cl.³ .......................................... F04B 49/08
[52] U.S. Cl. ..................................... 417/223; 74/867; 192/3.29
[58] Field of Search .................... 417/15, 223; 415/18; 192/3.31, 3.3, 3.29, 103 R; 74/752 C, 867, 868; 137/625.6, 625.63, 625.66, 625.69; 251/28, 29; 91/461

[56] References Cited

U.S. PATENT DOCUMENTS

| 2,824,632 | 2/1958 | Lucia et al. | 192/3.3 |
| 2,981,237 | 4/1961 | Gratzmuller | 137/625.6 X |
| 3,100,508 | 8/1963 | Mercier | 137/625.66 |
| 3,131,722 | 5/1964 | Abbott et al. | 137/625.6 |
| 3,810,531 | 5/1974 | Edmonds | 192/3.3 |
| 4,094,340 | 6/1978 | Bergeron | 137/625.66 |
| 4,254,799 | 3/1981 | Blatt | 137/625.66 X |

OTHER PUBLICATIONS

*Fundamentals of Fluid Power* by Wolansky et al., Houghton Mifflin Company, 1977, pp. 143, 144.

*Primary Examiner*—Edward K. Look
*Attorney, Agent, or Firm*—B. J. Murphy

[57] ABSTRACT

An embodiment of the invention comprises a pneumatically operated regulating valve having porting therein for venting therethrough the pilot-signal, pressured fluid which is normally conducted to the front clutch internal control valve of a power transmission. The regulating valve is in communication with a source of pneumatic pressures. When the pneumatic pressure of the source is elevated, it causes the regulating valve to vent the pilot-signal, pressured fluid. Resultantly, the transmission is prevented from going into its lock-up mode and, instead, remains in its converter mode. The method sets forth the steps of modifying a standard transmission, without altering the latter's as-built configuration and arrangement, to incorporate the novel controlling means.

4 Claims, 2 Drawing Figures

PNEUMATIC CONTROLLING MEANS FOR, AND IN COMBINATION WITH, A POWER TRANSMISSION, AND METHOD OF RETROFITTING TRANSMISSIONS THEREWITH

This invention pertains to power transmissions of the multi-speed, automatic type, and in particular to controlling means for such transmissions.

Power requirements for engine-powered equipments such as, for example, constant displacement gas compressors, are related to the operating parameters of the equipments. For the exemplary gas compressors, these parameters would comprise both the compression ratio and rotational speed (displacement) for given gas conditions. It follows, then, that there are various ratings of gas flow and corresponding compression ratios, for a given, end-item compressor, and gas condition, which will require a set power input.

Typical, commercially-available, variable delivery and variable discharge pressure, screw-type gas compression equipment use standard, multi-speed, automatic transmissions to transfer power from the prime mover to the compression equipment.

Typically, a conventional, multi-speed, automatic transmission operates either with the input shaft coupled to the prime mover through a torque converter or with the input shaft directly coupled to the prime mover by means of a clutch which locks the torque converter into a solid coupling. These modes are kown as either "converter" or "lock-up" operations and can exist in any mechanical drive gear ratio of the transmission. It is the lock-up clutch, then, which determines whether the prime mover drives the automatic transmission in the lock-up or converter mode.

The aforesaid relationships of power requirements to both flow rate and compression ratio, in gas compressors, are the basis for the dual ratings of such gas compressors. These compressors are rated at a high compression ratio at reduced flow rate (delivery) and at a lower compression ratio with full rated delivery. The automatic transmission used therewith is in the lock-up mode with the lock-up clutch engaged for the higher flow (lower pressure) rating. As the final discharge pressure of the end-item compressor is increased, the power requirements are also increased and the speed is decreased until the transmission lock-up clutch is released and the transmission shifts into the converter mode. Because of the fluid-coupling, torque-multiplying, effects in the "converter" mode, the transmission output shaft speed reduces to about 80% of its speed in the lock-up mode even though the transmission remains in its highest mechanical gear. Additionally, the torque converter is extremely efficient at this speed, so that the overall efficiency loss through the transmission is only about 2¼%. Therefore, nearly full rated prime mover power is transmitted through the transmission in either converter or lock-up mode.

Typically, the transmission manufacturer's standard (internal) speed sensitive circuits have been used to determine the output shaft speed (which reflected the discharge pressure, flow rate and power requirements of the end-item, driven gas compressor) to determine the points at which the transmission shifted between lock-up and converter operation. However this shifting method has several inherent faults:

1. Since the shift-down point from lock-up to converter operation depends on output shaft speed, it is necessary to "drag" the prime mover or transmission input speed down 20% before shifting (from lock-up to converter) can occur. This "lugging" condition can cause reduction of engine life in continuous duty service.

2. Engine horsepower output can vary as much as 5%. This causes both the up shift and down shift points to vary over a wide compressor discharge pressure range, from one machine to another. Engine governors sometimes require internal modifications to adjust shift points within acceptable discharge pressure limits. Additionally, there is no method for predicting unit performance once an engine is worn-in or if it is poorly maintained.

3. The transmission manufacturers' internally calibrated shift points vary within their normal tolerance to a degree that engine speed and/or discharge pressure shift points vary beyond acceptable limits.

4. In order to use a readily available transmission, it is necessary to specify that the operator deliberately overspeed the engine approximately 8% to ensure that the transmission properly shifts into the highest gear on start-up, or when shifting from converter to lock-up operation. This too can lead to premature engine life problems.

It is an object of this invention to set forth a novel, pneumatic controlling means for a power transmission which avoids the aforesaid, enumerated faults.

It is also an object of this invention to disclose, for use in combination with an automatic power transmission having a clutch internal control valve, which valve is operative in response to a pilot-signal, pressured fluid conducted thereto at given fluid pressures, the invention of pneumatic means for controlling the pilot-signal, pressured fluid and thereby supervising the control valve for effecting operation of said valve at other fluid pressures, comprising a source of pneumatic pressures; a regulating valve; said regulating valve having a first port for communication thereof with a pilot-signal, pressured fluid of an automatic power transmission control valve; said regulating valve also having a second port, spaced apart from said first port; wherein said regulating valve further has fluid-pressure-responsive means operative for effecting fluid communication between said first and second ports; and conduit means communicating said source of pneumatic pressures with said operative means to operate the latter.

It is another object of this invention to set forth, in combination with an automatic power transmission having a clutch internal control valve, which valve is operative in response to a pilot-signal, pressured fluid conducted thereto at given fluid pressures, pneumatic means for controlling the pilot-signal, pressured fluid and thereby supervising the control valve for effecting operation of said valve at other fluid pressures, comprising a source of pneumatic pressures; a regulating valve; said regulating valve having a first port for communication thereof with a pilot-signal, pressured fluid of an automatic power transmission control valve; said regulating valve also having a second port, spaced apart from said first port, wherein said second port is an exhaust port; said regulating valve further having fluid-pressure-responsive means operative for effecting fluid communication between said first and second ports; first conduit means communicating said source of pneumatic pressures with said operative means to operate the latter; and second conduit means communicating said first port with a pilot-signal, pressured fluid of an automatic power transmission control valve.

Another object of this invention is to teach, for automatic power transmissions which have a clutch internal control valve, which valve is operative in response to a pilot-signal, pressured fluid conducted thereto at given fluid pressures, a method of retrofitting such transmissions with pneumatic means for controlling the pilot-signal, pressured fluid and thereby supervising the control valve for effecting operation of said valve at other fluid pressures, comprising the steps of: providing a source of pneumatic pressures; providing a regulating valve which as (a) a pair of spaced-apart ports and (b) fluid-pressure-responsive means operative for effecting fluid communication between said ports; communicating one of said ports with the pilot-signal, pressured fluid which is conducted to the clutch internal control valve; and communicating the source of pressures with the operative means of the regulating valve, whereby (1) said ports will communicate and (2) the pilot-signal, pressured fluid will be vented through the other of said ports.

Figure 2:
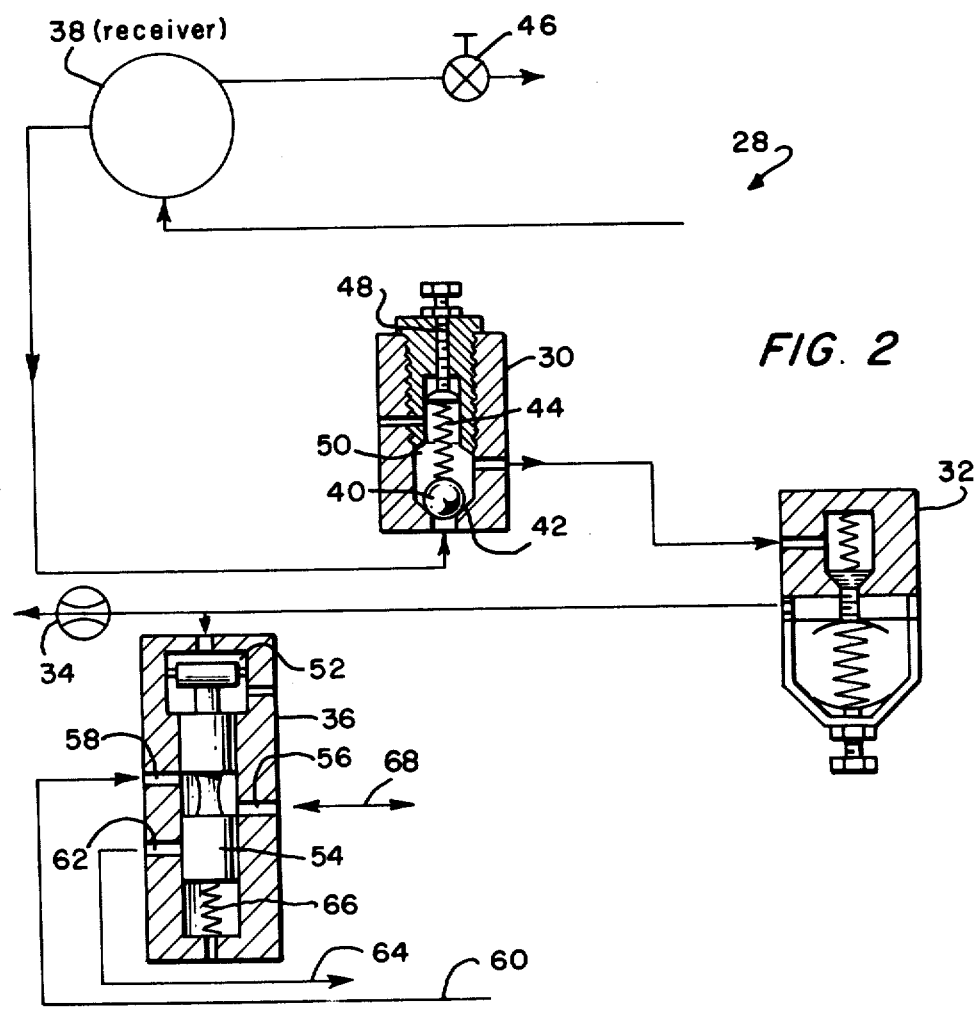

Further objects of this invention, as well as the novel features thereof, will become more apparent by reference to the following description taken in conjunction with the accompanying figures, in which:

FIG. 1 is a block diagram of a typical prime mover-automatic transmission-end item (gas compressor) configuration to which the novel controlling means has been retrofitted; and FIG. 2 is a schematic and pictorial diagram of an embodiment of the controlling means of the invention.

Only for exemplary purposes, the invention is described in connection with a gas compressor as the powered or driven end item.

As shown in FIG. 1, a typical, automatic transmission, prime mover, and end item (compressor) arrangement 10 comprises the prime mover 12, transmission input shaft 14, a transmission front governor 16, and a pressured-fluid (hydraulic), pilot signal line 18 which communicates with the clutch internal control valve 20 of the transmission. Now, in normal operation, if the front or lock-up clutch 22 is engaged, the transmission is operating in the "lock-up" mode (irrespective of the gears). If this clutch is disengaged, the transmission is operating in the "coverter" mode (irrespective of the gears). The clutch internal control valve 20 senses input shaft speed via a pressure, pilot-signal from the front governor 16 and determines whether the transmission should be in the "lock-up" or "converter" mode dependent on the input shaft speed. The front governor 16 senses the input shaft speed and signals the clutch internal control valve 20 which then opens to engage the front or lock-up clutch 22 by means of conventional linkage (represented by the upwardly-directed, dashed line originating at the clutch internal control valve 20). The oil pressure supply source (not shown) is directed to the front or lockup clutch 22.

The remaining assemblage 24 of the transmission, comprising modulation valves, rear clutch, gears, etc., remain as built and unaffected by the invention, and drive the end item 26 (gas compressor) conventionally. In this typical transmission, then, when the load decreases, and the speed of shaft 14 increases, the fluid-pressured, pilot-signal in line 18 from the governor 16 gets stronger, and the valve 20 engages the clutch 22. Conversely, when the load increases, and the shaft speed decreases, the pilot-signal attenuates, and the valve 20 disengages the clutch 22, by means of the aforesaid conventional linkage (represented here by the downwardly-directed, dashed line originating at the clutch internal control valve 20). In the former circumstance, the transmission is in its lock-up mode; in the latter circumstance, the transmission is in its converter mode. In this normal operation, then, the front or lock-up clutch 22 is controlled by the front governor 16 which senses the turbine speed of the torque converter (via shaft 14) and engages or disengages the clutch according to the hydraulic pressure in line 18. Clutch 22, in either the engaged or disengaged mode is coupled to a mechanical input means 70, for the assemblage 24, by further conventional linkage (represented by the dashed lines originating at the clutch 22, in both modes). Finally, another mechanical input means 72, for the end item compressor 26, couples the latter to the assemblage 24. The means 28 of the invention, which is retrofitted to the arrangement 10, concerns the final (highest) transmission gear ratio and overrides the normal interaction between the turbine speed, reflected by shaft 14, and the lock-up clutch 22. The inventive means 28 communicates with the pilot-signal line 18 through a conduit 68.

According to an embodiment 28 of the invention, the pneumatic controlling means comprises a gas pressure operated pilot-valve 30, a pressure reducing valve 32 which is optional, a relief orifice 34, an external transmission lock-up clutch control valve 36, a compressed gas receiver 38, and associated gas and hydraulic tubing. The means senses the compressor 26 discharge pressure via the gas pressure operated shift pilot valve 30 and signals the transmission to operate in either the lock-up or converter mode depending on pressure level rather than transmission input shaft speed of shaft 14.

The operation of the novel pneumatic controlling means is as follows. With the engine 12 stopped and no pressure in the compressed gas receiver 38, a ball 40 in the pressure operated shift pilot valve 30 will be held against a lower seat 42 by a spring 44. The transmission shifter (not shown) is placed in the highest drive gear after starting the engine 12. As the engine is accelerated to rated speed, the internal hydraulics of the transmission automatically shift it into the highest gear ratio, and pressure begins to rise in the receiver 38 (with a service valve 46 closed). When the pressure reaches a level preset by an adjusting screw 48 for the pressure-operated shift pilot valve 30, the ball 40 moves up off the lower seat 42 and resets on an upper seat 50 thus establishing gas flow through the optional pressure reducing valve 32, the relief orifice 34, and into a pilot chamber 52 of the external transmission lock-up clutch control valve 36. Until the preset gas pressure is achieved at the inlet of the shift pilot valve 30, the spool 54 in the external transmission lock-up clutch control valve 36 is held by the spring 66 so that a port 56, connected to the front governor 16 and lock-up clutch pilot valve 20, is open to a port 58 which is connected to the transmission oil pump 60. Thus, full hydraulic pressure is directed to the lock-up clutch valve 20 and the transmission is held in the lock-up mode. When the shift pilot valve 30 is stroked, gas pressure on the pilot 52 of the external transmission front clutch control valve 36 causes the spool 54 to shift so that port 58 is blocked and port 56 is connected to a port 62, and the front governor 16 and lock-up clutch pilot line 18 is vented to atmospheric pressure (via the transmission oil sump 64). Since connecting port 56 to port 62 also vents any internal signals to the front clutch 22, the transmission will remain in the converter mode until the pressure operated shift pilot valve ball 40 reseats on the lower seat 42 due to decreasing pressure in the gas receiver 38. When the ball 40 reseats on the lower seat 42, the pilot pressure on port 52 is exhausted through the orifice 34, and a spring 66 returns the spool to its normal position. Port 56 is connected to port 58 and the transmission returns to lock-up operation.

The pressure operated shift pilot valve 30 is constructed similar to a conventional safety relief valve with built-in hysterisis, i.e. it requires a higher pressure to move the ball 40 from the lower seat 42 to the upper seat 50 that is required to reseat the ball 40 on the lower seat 42. This prevents the transmission from "hunting" between converter and lock-up operation. The optional pressure reducing valve 32 permits a low pressure hydraulic external front clutch control valve 36 to be used with high pressure gas systems. The relief orifice 34 serves as a vent for the pilot chamber 52 and also expels moisture from the gas system.

After initial factory proof tests and adjustment of the pressure operated shift pilot valve 30, it can be permanently sealed. Transmission shifting will then be dependent solely on gas receiver pressure, avoiding the problems mentioned above due to using conventional shifting methods.

The invention described provides a means for controlling the output speed of an automatic transmission so that dual ratings of a compressor 26 may be achieved. The compressor will deliver high gas flow at a low compression ratio, and low gas flow at a high compression ratio utilizing full engine power at either rating. Additionally, the transmission automatically shifts between ratings without requiring an operator to declutch the compressor, shift gears, or to adjust inlet valving.

As will be appreciated, it is extremely easy to retrofit an existing prime mover-transmission-end item (compressor) arrangement 10. It is only necessary to tap in to line 18 and communicate the latter with port 56 of valve 36, as FIGS. 1 and 2 illustrate, by means of the conduit 68. In its broad aspect, then, for automatic power transmissions which have a clutch internal control valve, such as valve 20, which valve is operative in response to a pilot-signal, pressured fluid conducted thereto, via a line 18 or the like, at given fluid pressures, a method of retrofitting such transmissions with pneumatic means, such as means 28, for controlling the pilot-signal, pressured flud and thereby supervising the control valve 20, for effecting operation of said valve at other fluid pressures, only comprises the steps of providing a source of pneumatic pressures, such as receiver 38, providing a regulating valve, such as valve 36, which has (a) a pair of spaced-apart ports, such as ports 56 and 62, and (b) fluid-pressure-responsive means, such as spool 54, operative for effecting fluid communication between said ports; communicating one of said ports (i.e., port 56) with the pilot-signal, pressured fluid which is conducted to the clutch internal control valve (i.e., valve 20); and communicating the source of pressures (i.e., receiver 38) with the operative means (i.e., spool 54) of the regulating valve (i.e., valve 36), whereby (1) said ports will communicate and (2) the pilot-signal, pressured fluid will be vented through the other of said ports (i.e., port 62).

While we have described our invention in connection with a specific embodiment thereof, and in relation to particular methods of retrofitting a power transmission therewith, it is to be clearly understood that this is done only by way of example and not as a limitation to the scope of the invention as set forth in the objects thereof and in the appended claims.

What is claimed is:

1. In combination with an automatic power transmission which has a clutch, and an internal clutch control valve operatively coupled to said clutch, said clutch control valve being operative in response to a pilot-signal, pressure fluid conducted thereto at given fluid pressures to cause said clutch to engage and disengage, and a line coupled to said clutch control valve for conducting pilot-signal, pressured fluid to said valve, pneumatic means for controlling the pilot-signal, pressured fluid conducted to said control valve, as aforesaid, for effecting operation of said valve at other fluid pressures, comprising:

a source of pneumatic pressures;

a regulating valve;

said regulating valve having a first port for communication thereof with said pilot-signal, pressured fluid line coupled to said clutch control valve;

said regulating valve also having second and third ports spaced apart from said first port, wherein said second port is an exhaust port;

said third port comprises means for admitting hydraulic fluid, under pressure, to said regulating valve for communication of said hydraulic fluid with said first port;

said first and second ports are normally in communication;

said regulating valve further having fluid-pressure-responsive means operative for effecting fluid communication between said first and second ports;

first conduit means communicating said source of pneumatic pressures with said operative means to operate the latter; and second conduit means communicating said first port with said pilot-signal, pressured fluid line; wherein said first conduit means includes means interposed between said source of pneumatic pressures and said operative means of said regulating valve for opening and closing fluid communication therebetween; and said interposed means comprises means responsive to a given pneumatic pressure from said source for opening said fluid communication thereof with said operative means of said regulating valve, and responsive to a pneumatic pressure of other than said given pressure for closing said fluid communication of said source with said operative means.

2. The combination, according to claim 1, wherein: said operative means comprises means normally prohibiting fluid communication between said ports.

3. The combination, according to claim 1, wherein: said interposed means comprises a pilot valve; and said pilot valve comprises means for selectively adjusting valving operation thereof to cause said fluid-communication-opening, operative, given pneumatic pressure of a prescribed pressure level to be of another pressure level.

4. The combination, according to claim 3, wherein: said source comprises a compressed gas receiver.

* * * * *